A. S. FORD.
ELECTRIC KETTLE AND THE LIKE.
APPLICATION FILED MAR. 24, 1920.
1,390,028.
Patented Sept. 6, 1921.
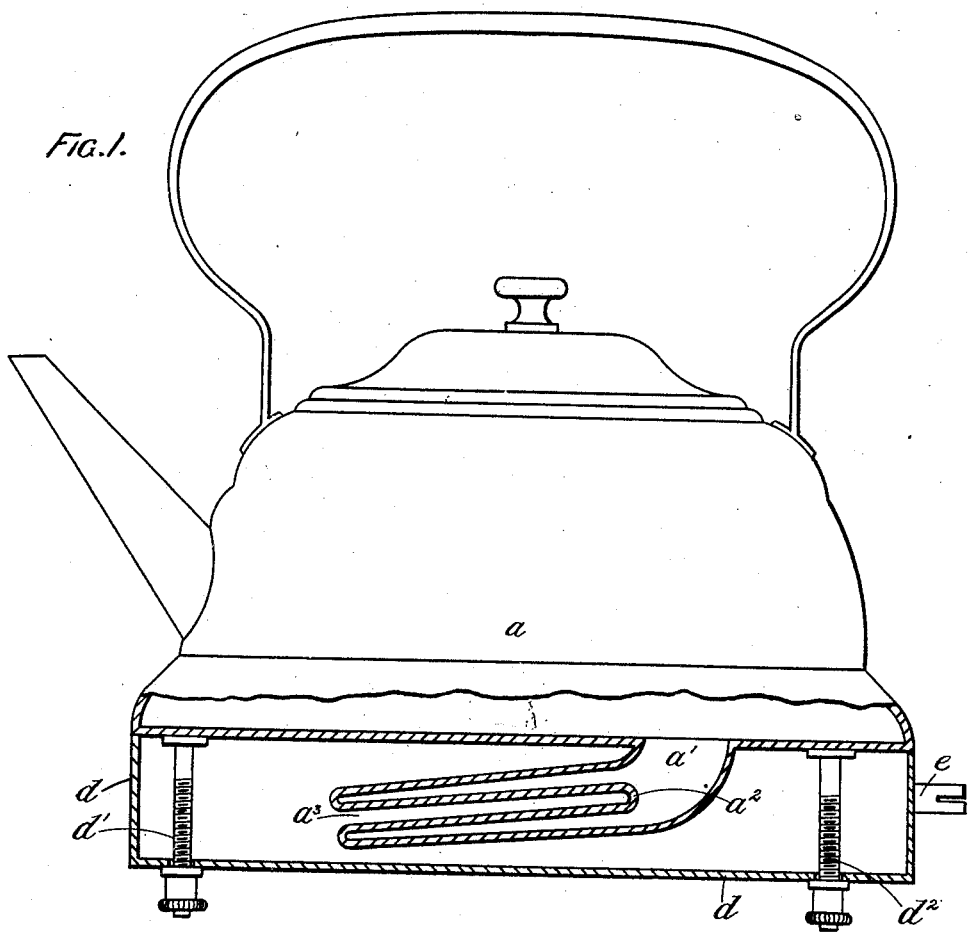
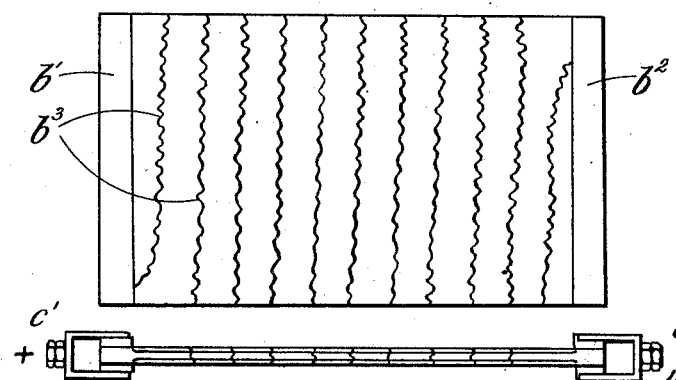
INVENTOR
ALLEN SAMUEL FORD

UNITED STATES PATENT OFFICE.

ALLEN SAMUEL FORD, OF TAUNTON, ENGLAND.

ELECTRIC KETTLE AND THE LIKE.

1,390,028.          Specification of Letters Patent.     Patented Sept. 6, 1921.

Application filed March 24, 1920. Serial No. 368,321.

*To all whom it may concern:*

Be it known that I, ALLEN SAMUEL FORD, a subject of the King of Great Britain and Ireland, and a resident of Taunton, county of Somerset, England, have invented a certain new and useful Improvement in Electric Kettles and the like, of which the following is a specification.

This invention relates to improvements in electric kettles and the like, and is applicable to urns, jugs and other vessels for heating liquids by electricity.

The objects of my invention are to arrange the heating elements in the bottom of the vessel so that they are always surrounded by liquid, and are not liable to the risk of getting burnt out by being left exposed or uncovered when the liquid is poured out, and also to enable the heating elements to be easily and quickly removed without skilled assistance.

According to this invention, I make a well extending across the bottom of the vessel at right angles to the direction in which the liquid is poured out. The well may be vertical, but is preferably inclined at an angle with the bottom plate of the vessel so as to get the necessary depth in a small vertical distance, and one or more weirs, according to the number of heating elements employed, are arranged longitudinally in the well, dividing it into compartments. These weirs are hollow to receive the heating elements from below, and serve to retain the liquid in the compartments of the well so that all the elements are below the surface of the liquid in the well.

The mouth or opening of the inclined well in the bottom of the vessel is on the side remote from the pouring spout, so that the well is not emptied by the action of tilting the vessel in pouring out the liquid.

The heating elements employed are of known pattern, in which resistance wires are arranged on a flat plate of mica or other suitable insulating material having metallic caps at the ends to which the ends of the resistance wires are connected. The whole is then inclosed in insulating material, such as mica plates, and slipped into the hollow weir from below, the metallic caps making electrical contact with spring clips connected with the positive and negative terminals which are fixed on the body of the vessel, but insulated therefrom.

The heating elements with the electrical connections and the well are inclosed by a removable bottom which may be secured to the body of the vessel by means of binding screws and nuts, or it may be hinged at one side of the vessel and fastened at the other side with an easily operated spring catch so that access to the elements is quickly obtained with either form of attachment.

On switching on the electric current the body of liquid in the vessel is heated not only by conduction through the metal plates of the vessel but also by convection currents which in passing over the heated sides of the weirs pick up the heat and distribute it through the body of the liquid. The quantity of liquid contained in the compartments of the well is small and the circulation of the liquid therein is rapid.

Referring to the accompanying sheet of drawings:—

Figure 1 illustrates the invention adapted to a kettle, and is an elevation, partly in section, showing a kettle with removable bottom, and with a well having one weir and suitable for one flat heating element, not shown in the figure.

Fig. 2 represents one form of heating element having a resistance wire wound on a flat plate of non-conducting material with a metallic cap at each end.

Fig. 3 is a front view of Fig. 2, but showing the spring clips at the ends, which clips are to be connected to the positive and negative of the electric supply.

In the figure, $a$ is the body of the kettle, $a'$ is the well, $a^2$ is the weir, and $a^3$ is the hollow space into which is fitted the element $b$ with metallic end caps $b'$, $b^2$. $c'$, $c^2$ are the spring clips into which are slipped the end caps $b'$, $b^2$. $b^3$ represents the resistance wire. $d$ is the removable bottom protecting the well and the electrical arrangements and is secured by screws and nuts $d'$, $d^2$. $e$ represents one of a pair of pins which are to be in electrical connection with the spring clips $c'$, $c^2$, and which engage with a socket wired to the source of electric supply in the usual way.

I claim:—

1. An electrically heated utensil of the class described, having a well formed in one wall thereof, and electrical heating means arranged to transmit heat to the well.

2. An electrically heated utensil of the class described, having a well formed in the bottom wall thereof and electrical heating means arranged in contact with the walls of the well.

3. An electrically heated utensil of the class described, having a well formed in the bottom wall thereof, the said well having a portion extending toward the pouring spout of the utensil, and electrical heating means arranged in contact with the wall of the well.

4. An electrically heated utensil of the class described having a well formed in its bottom wall, electrical heating means arranged in contact with the outer wall of the well, and a casing adapted to be arranged about the base of the utensil for concealing said well.

5. An electrically heated utensil of the class described having a well formed in its bottom wall, the mouth of said well extending across the bottom of the utensil at right angles to the direction of pouring and a portion of the wall of said well being disposed toward the pouring edge of the utensil to prevent emptying of the well during pouring, means for electrically heating said well, and a casing carried by the bottom of the utensil for concealing the well and supporting the utensil.

6. An electrically heated utensil of the class described including a heating well carried by the bottom wall of the utensil and in open communication with the interior thereof, the walls of said heating well being formed to provide a plurality of hollow weirs for dividing the well into compartments, electrical heating means arranged in contact with the walls of the well, and means carried by the base of the utensil for permitting the same to stand upright.

7. An electrically heated utensil of the class described having an electrically heated liquid trapping portion in communication with the interior of the utensil.

8. An electrically heated utensil of the class described having an electrically heated liquid trapping portion in communication with the interior of the utensil and arranged to hold the liquid when the utensil is tilted for pouring.

In testimony whereof I have affixed my signature hereto this 27th day of February, 1920.

ALLEN SAMUEL FORD.